April 26, 1927.  J. A. FELTON  1,625,886
STEERING ATTACHMENT FOR VEHICLES
Filed March 9 1925   2 Sheets-Sheet 1
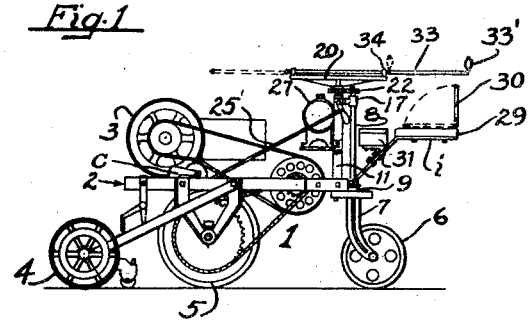
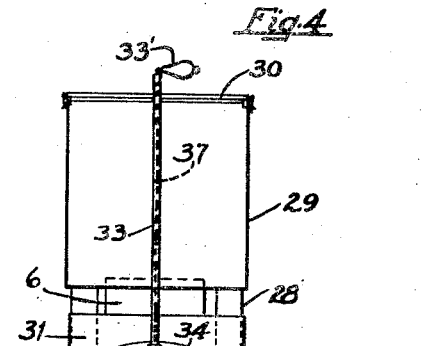
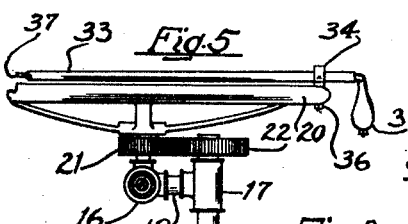
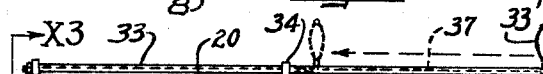
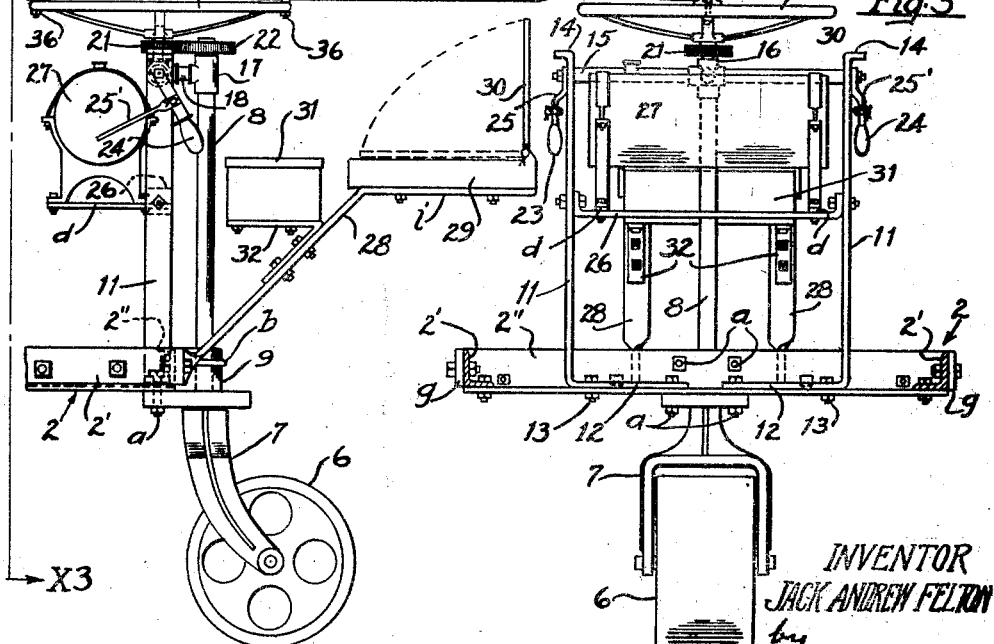
INVENTOR
JACK ANDREW FELTON April 26, 1927.
J. A. FELTON
1,625,886
STEERING ATTACHMENT FOR VEHICLES
Filed March 9 1925
2 Sheets-Sheet 2
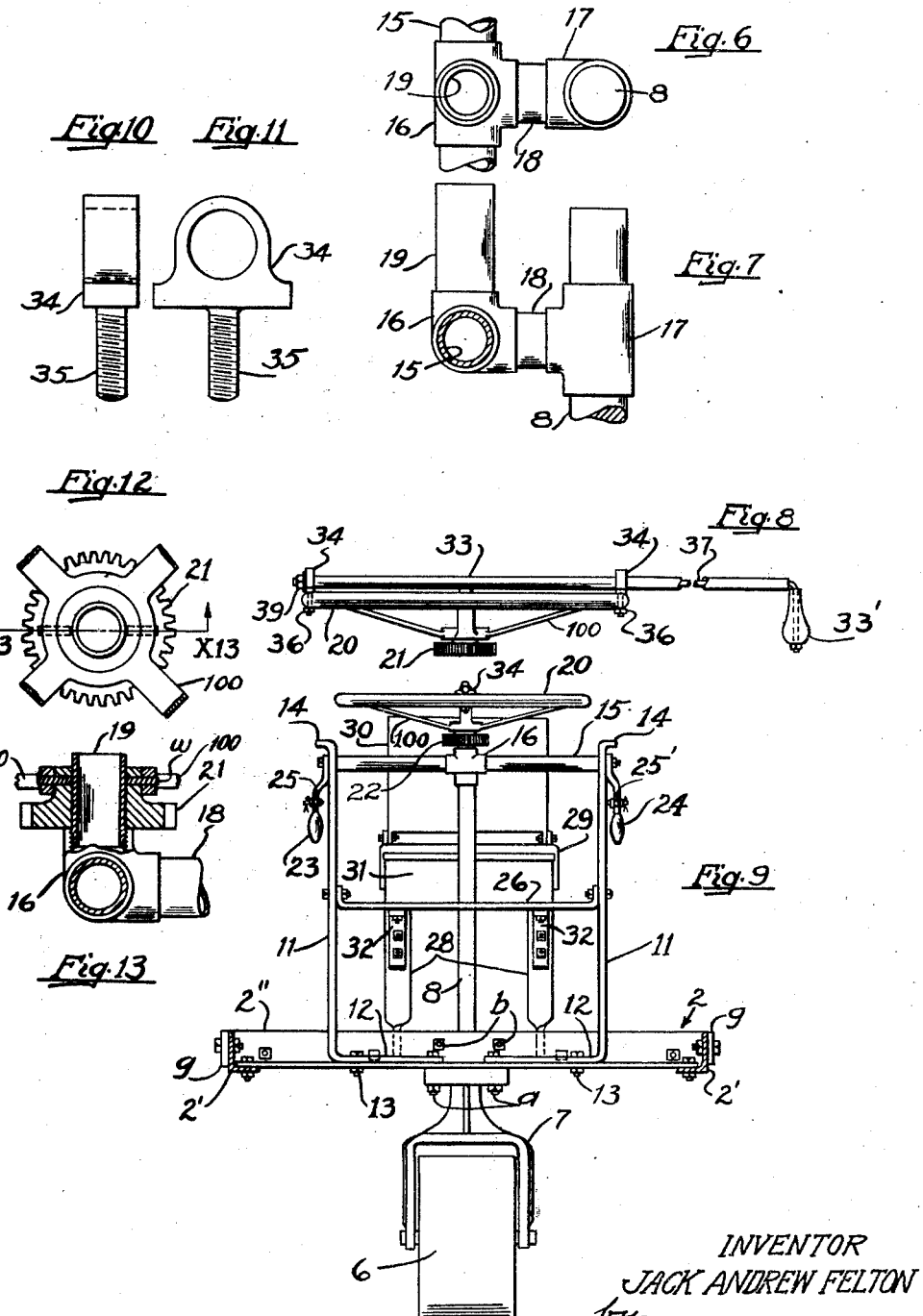
INVENTOR
JACK ANDREW FELTON
WITNESS
Robt. S. Woolsey.
by
James R. Townsend
his atty.

Patented Apr. 26, 1927.

1,625,886

UNITED STATES PATENT OFFICE.

JACK ANDREW FELTON, OF LOS ANGELES, CALIFORNIA.

STEERING ATTACHMENT FOR VEHICLES.

Application filed March 9, 1925. Serial No. 14,111.

An object of my invention is to provide an attachment for power lawn mowers whereby the operator may ride without decreasing the working speed of the mower.

A further object is to provide novel means of the above character which may be readily attached to power mowers now in extensive use.

Other features are simplicity of construction, cheapness in manufacture, and greater efficiency of operation of a machine equipped with my attachment.

I have found by experiment that when a power mower of the present type is equipped with riding attachments heretofore known that the speed of the machine has been materially decreased from that when the operator walks, but that the same machine equipped with my novel riding attachment permits the operator to cut the same amount of lawn in a shorter time than that required when the operator walks. As for example, if it takes an operator 6½ to 7 hours to cut 2½ acres with a walking machine, by equipping the same machine with riding attachments heretofore known it would take the operator from 8 to 8½ hours to cut the same lot; and with the same machine equipped with my novel riding attachment the operator is enabled to cut the same lot in from 3½ to 4½ hours.

Other objects, advantages and features of invention may appear from the accompanying drawings, the subjoined detailed description and the appended claims.

The accompanying drawings illustrate the invention.

Figure 1 is a side elevation of a power lawn mower having my novel riding and walking attachment secured thereto.

Fig. 2 is an enlarged side elevation of my invention secured to a mower frame, a fragment of which is shown. Dotted lines indicate a folded position of the seat back and forward position of the steering handle used when walking.

Fig. 3 is a section on line $x^3$, Fig. 2.

Fig. 4 is a plan view of my invention as shown in Figs. 2 and 3.

Fig. 5 is a fragmentary side elevation of the steering mechanism.

Fig. 6 is an enlarged fragmentary plan view of the steering wheel post support and a bearing for the steering post, a fragment of which is shown.

Fig. 7 is a side view of the parts shown in Fig. 6.

Fig. 8 is a side view showing a detached assembly of the steering wheel and steering handle used when walking.

Fig. 9 is a view on the same scale as, and similar to, Fig. 3, but with the fuel tank removed.

Fig. 10 is a side view of the bearing and mounting block for the steering handle used when walking.

Fig. 11 is a face view of the bearing shown in Fig. 10.

Fig. 12 is a fragmental plan view of the steering wheel hub with pinion fixed thereto.

Fig. 13 is a fragmental section on a plane indicated by line $x^{13}$, Fig. 12, showing the steering wheel and pinion mounted on its post support.

My attachment is especially adapted for attachment to a well known type of power lawn mower 1, which comprises a rectangular frame 2 having side members 2′ and end members 2″, upon which is mounted a moto 3, and to which the mower 4 and driving roller 5 are secured. A wheel 6 is centrally positioned at the rear of the frame 2, and supports the rear of the frame 2 and is adapted to steer the mower along its course. Said wheel is mounted in a yoke frame 7 that is fixed to a steering post 8, and is journalled in a bearing 9 secured to the frame 2 by the bolts $a$ and U-bolt $b$.

A pair of vertically positioned uprights or posts 11, preferably formed of strap iron are secured to the rear end member 2″ of the frame 2. These posts each have a bent end that forms a horizontal leg 12, and bolts 13 extending through the leg and rear end member 2″ securely fix the posts to such rear end member. Each of the posts 11 is bent at the top or other end thereof to form an outwardly projecting lug 14, the purpose of which will be more fully hereinafter described.

A cross member in the form of a tube 15 extends between the posts 11 adjacent the top thereof, and is threaded through a T-pipe fitting 16 and connected to the upright 11. A T-pipe fitting 17 is coupled to the fitting 16 by a short pipe section 18, and the post 8 is journalled at its upper end in the fitting 17. A short post in the form of a pipe section 19 rises from the fitting 16, and a steering wheel 20 is removably mounted thereon.

A pinion 21 is secured to the wheel 20 and meshes with a gear 22 fixed to the upper end of the post 8. Although I have shown the pinion 21 fixed to the hub of the steering wheel 20 by means of pins $w$ it is understood that such pinion and hub may be cast integral with each other.

Thus as the steering wheel is manipulated, the yoke 7 and wheel 6 are swung in a reverse direction to thereby steer the mower in a direction that will correspond to the direction of rotation of the steering wheel. This reverse movement of the wheel 6 is because of the pinion 21 and gear 22 between the wheel 20 and shaft 8.

The wheel 20 and pinion 21 are journalled on the post 19 and are retained thereon by gravity, thereby permitting removal of the wheel 20 and associated parts, so that ready access may be had to parts underneath such wheel.

A pair of control handles 23 and 24 are mounted on either end of a rod extending through the tube 15, and the usual control rods 25, 25' extend to the usual belt tightener $c$ to cause operation of the roller 5, or to raise and lower the cutter 4. These handles may be operated independently of each other and when swung upwardly engage the lugs 14 which limit their upward movement, and when in engagement with the lugs 14, the rods 25, 25' are thrown over the center of the axis of rotation of said handles and are thus held in operative position.

The usual fuel tank 27 is preferably mounted on a cross bar 26 that is preferably formed of strap iron and has upturned ends that are secured to the uprights or posts 11, thereby positioning the tank within easy reach of the operator when riding.

A pair of supports $d$ are secured to the cross bar 26 and support the outer or forward end of the tank 27 and thus provide a rigid support for the tank 27.

To adapt the mower so that the operator may ride instead of being required to walk, I have provided a novel attachment which may be securely fastened to the frame 2, and which comprises a pair of strap irons that form supporting arms 28 that are bent to form side arms $g$ that are secured to the side members 2', and rear arms $h$ normal to the side arms that are secured to the rear end member 2'' of the frame 2.

The arms $h$ extend toward the center of the frame and are then bent rearwardly away from the frame and are given a 90° twist. The arms 28 then extend upwardly and rearwardly from the frame a suitable distance and are provided at their rear end with a horizontal portion $i$ to which a seat 29 is secured. The side arms $g$ and rear arms $h$ are adapted to go around the rear corners of the frame 2 and thus strengthens the frame which is subjected to great vibration.

A back 30 is pivoted to the seat 29, and may be folded downwardly upon the seat if desired. The usual tool box 31 is mounted on brackets 32 that are preferably secured to the inclined portion of the arms 28.

Thus far the riding attachment has been described, which is mounted directly on the frame and as will be seen from the drawings, the weight of the operator will be carried directly by the frame 2 and thus eliminates the friction or drag of the trailers heretofore used as riding attachments and also provides better traction of the drive roller 5. However, the operator may find it desirable at times to walk behind the mower.

While walking it would be very difficult to reach the steering wheel 20, therefore, I have provided novel means which will enable the operator to walk behind the mower and still afford easy steering of the mower. Such means comprise an extensible handle 33, which is slidably and rotatably journalled in a pair of bearing blocks 34. These blocks are positioned at diametrically opposite points on the wheel 20, and have a threaded shank 35, which extends through the wheel rim and a nut 36 threaded thereon holds them firmly in place. If preferred the blocks 34 may be cast integral with the spokes 100 of the wheel 20.

The handle 33 may be any desirable length, preferably of such length that it will extend beyond the back of the seat 29. A hand grip 33' is provided at the rear end of the handle 33 which may be readily grasped by the operator to steer the mower.

Although I have shown the handle 33 as comprising a tube and a rod 37 extending through the tube and the hand grip secured to a bent end of said rod, it is understood that the handle may be made of a solid or hollow rod throughout. Means are provided to prevent accidental withdrawal of the handle 33 from the bearings 34 and comprise a nut 39 threaded to the end of the handle; or as shown to one end of the rod 37.

When the operator desires to ride or when not in use the handle 33 is moved forwardly to the position shown in dotted lines, Figs. 1 and 2.

I claim:

1. In combination with a power tractor having a frame; a wheel; a yoke in which said wheel is mounted; uprights secured to said frame; a cross member connecting said uprights; a steering post rising from said yoke and being rotatably supported from said frame; a steering wheel journalled to said cross member; and operative means connecting said steering wheel and said steering post.

2. In combination with a power tractor having a frame, a pair of uprights secured to said frame, control handles mounted on said uprights, a guide wheel, a yoke in which said wheel is mounted, a steering post rising from said yoke, means to support said steering post, a steering wheel, means to mount said wheel on said uprights and gear means connecting said steering wheel and said steering post.

3. In combination with a power tractor having a frame, a pair of uprights secured to said frame, a guide wheel, a yoke in which said wheel is mounted, a steering post rising from said yoke, means to support said steering post, a tube mounted between said uprights, a pipe coupling on said tube, a post rising from said coupling, a steering wheel mounted on said post, a pinion secured to said steering wheel, and a gear on said steering post meshing with said pinion.

4. The combination with a power tractor having a frame including a yoke; of a guide wheel mounted in said yoke; uprights secured to said frame; a cross member connecting said uprights; a steering post rising from said yoke and being rotatably supported from said frame; a steering wheel journalled to said cross member; and gears carried by said steering post and steering wheel adapted for turning said steering post in the direction reverse to that in which the steering wheel is turned.

In testimony whereof, I have hereunto set my hand at Los Angeles, California, this 2nd day of March, 1925.

JACK ANDREW FELTON.